Feb. 23, 1943.　　　B. S. FLORADAY　　　2,311,821
VEHICLE DOOR HANDLE
Filed Oct. 22, 1941
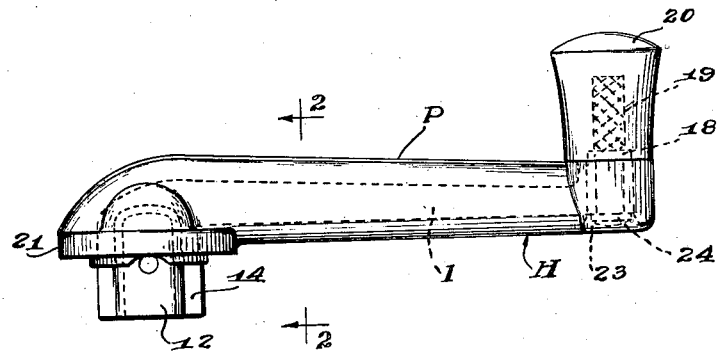
Fig.1.
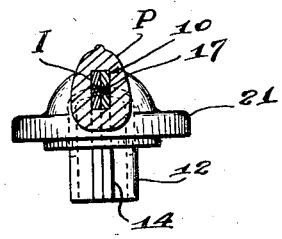
Fig.2.
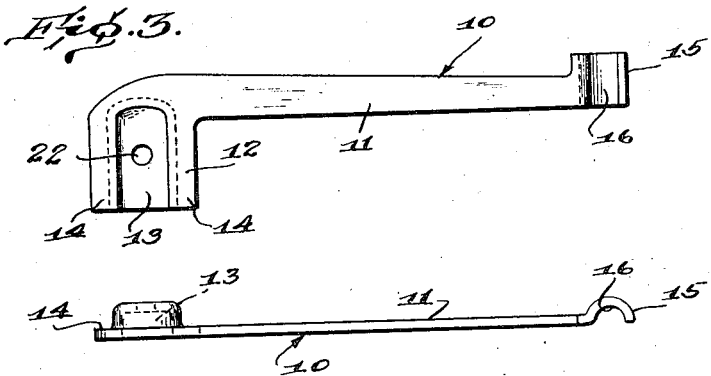
Fig.3.
Fig.4.
Burton S. Floraday
INVENTOR
BY Malcolm W. Fraser
ATTORNEY Patented Feb. 23, 1943

2,311,821

UNITED STATES PATENT OFFICE 2,311,821

VEHICLE DOOR HANDLE

Burton S. Floraday, Toledo, Ohio, assignor to Detroit Harvester Company, Detroit, Mich., a corporation of Michigan Application October 22, 1941, Serial No. 416,075

2 Claims. (Cl. 74—545)

This invention relates to handles particularly adapted for vehicle doors such as inside automobile door handles used for actuating door latches and for operating window regulators, and an object is to produce a simple and efficient handle of this character which substantially reduces the amount of metal required and employs in substitution for much of the metal ordinarily used, plastic materials.

Another object is to produce a handle of this character having a stamped sheet metal stiffener or insert which in the main is covered or encased in plastic material.

A further object is to produce a vehicle door handle having the new and improved features of construction and arrangement hereinafter described and for purposes of illustration but not of limitation, an embodiment of the invention is shown in the accompanying drawing in which Figure 1 is a side elevation of a vehicle door handle such as is commonly used for window regulator operation;

Figure 2 is a transverse sectional view substantially on the line 2—2 of Figure 1;

Figure 3 is a side elevation of one of the stamped sheet metal sections making up the stiffener or insert for the handle; and Figure 4 is an edge view of the stiffener or insert part shown on Figure 3.

The illustrated embodiment of the invention comprises a handle H which is of the type ordinarily mounted on the inside of an automobile door for actuating the window regulator mechanism. The handle H comprises an insert or stiffener member I which is covered by a substantial thickness of plastic material P which may be of any suitable material such as Tenite, rubber or the like. In forming the handle, the insert I is placed in a suitable mold and the plastic material is introduced into the molding to fill the cavity surrounding the insert.

In accordance with this invention, the insert I is of metal and as shown, consists of a pair of sheet metal stampings 10 having a relatively thin flat horizontal arm 11 and an outwardly extending enlarged end portion 12. The enlarged end portion 12 is formed with a substantially U-shaped cavity 13 formed by outwardly pressing or embossing the metal, there being relatively flat flanges 14 at opposite sides of the depressed portion which are flush with the adjacent side of the arm 11. The opposite end of the arm is provided with an enlargement 15 a portion of which extends in a direction opposite to the enlargement 12. The enlargement 15 is depressed to form a substantially semi-cylindrical cavity 16. It will be understood that a pair of these sections 10 are employed, one abutting against the other, these being oppositely disposed so that the mating cavities 13 together provide substantially a rectangular spindle receiving socket, the inner end of which is closed. Also the mating end portions 16 together form a substantially cylindrical opening for a purpose which will hereinafter appear. Two sections are then fixedly secured together as by a series of spot welds 17.

It will be observed that in molding the part, a flared recess 23 is provided on the under side in the region of the cylindrical opening formed by the mating parts 16. After the handle is formed with a plastic covering, a knob 20 is mounted in place. The knob 20 may be of plastic similar to that forming the body of the handle and embedded therein is an elongate pin having a knurled stem portion 19 below which is a collar 18. Below the collar 18 is a pin portion which passes through the opening provided by the mating cylindrical parts 16. The portion of the pin projecting into the flared socket 23 is headed or riveted over as indicated at 24 to hold the pin in place. This enables the knob 20 to be turned and provides a finger engaging piece for operating the handle.

In the region of the enlargement 12, the plastic material P is formed into a disc-like collar 21 which cooperates with the usual escutcheon in affording the desired ornamental appearance as well as increasing the strength of the handle in that region. Holes 22 are formed in the sides of the walls of the cavities 13 to receive the usual pin for attaching the handle to the spindle.

From the above description, it will be apparent that I have produced an extremely simple and inexpensive handle construction which reduces to a minimum the amount of metal employed and makes most efficient use of the stiffening metal, to afford the desired rigidity and strength to the structure. Since the insert can be made from sheet metal stampings, its cost is reduced substantially and enabling the stiffener to be made efficiently on a production basis.

It is to be understood that numerous changes in details of construction, arrangement and operation may be effected without departing from the spirit of the invention especially as defined in the appended claims.

What I claim is:

1. A vehicle door handle comprising a stamped sheet metal stiffener having relatively thin mating sections, each section including an elongate relatively narrow flat arm portion, an enlarged end portion having a spindle-receiving socket formed by providing a depressed substantially U-shaped cavity in said enlarged end portion and flat abutting flanges on opposite sides of said cavity, spot welds for holding said sections rigidly together, a hard coating of plastic material covering said stiffener, and an integral collar of plastic material on said enlarged end portion.

2. A vehicle door handle comprising a stamped sheet metal stiffener having relatively thin mating sections, each section including an elongate relatively narrow arm portion, an enlarged end portion having a spindle-receiving socket formed by providing a depressed substantially U-shaped cavity in said enlarged end portion and flat abutting flanges on opposite sides of each cavity, spot welds for holding said sections rigidly together, an enlargement at the opposite end of said stiffener forming substantially semi-cylindrical cavities in each section thereby to produce an annular bearing portion, a pin in said bearing portion having a narrowed outer end, a plastic knob fitting said narrowed end portion, and a hard coating of plastic material covering said stiffener.

BURTON S. FLORADAY.